United States Patent [19]

Leung et al.

[11] Patent Number: 5,163,156
[45] Date of Patent: Nov. 10, 1992

[54] METHOD FOR DISTRIBUTING MESSAGES THROUGH A MAPPING TABLE WHICH INCLUDES FOR EACH ORIGINATING DEVICE A SEQUENTIAL LIST OF CORRESPONDING DESTINATION DEVICES

[75] Inventors: Wu-Hon F. Leung, Downers Grove; Gottfried W. R. Luderer, Naperville; Michael J. Morgan, Warrenville, all of Ill.; Philip R. Roberts, Oklahoma City, Okla.; Shi-Chuan Tu, Lisle, Ill.

[73] Assignee: AT&T Bell Laboratories, Murray Hill, N.J.

[21] Appl. No.: 496,063

[22] Filed: Mar. 16, 1990

Related U.S. Application Data

[63] Continuation of Ser. No. 224,832, Jul. 27, 1988, abandoned.

[51] Int. Cl.⁵ .............................. G06F 13/00
[52] U.S. Cl. ........................ 395/800; 370/105; 395/325; 364/DIG. 2; 364/940; 364/940.1; 364/919; 364/955.5
[58] Field of Search ... 364/200 MS File, 900 MS File; 395/800, 325, 725; 370/105

[56] References Cited

U.S. PATENT DOCUMENTS

| | | | |
|---|---|---|---|
| 4,156,798 | 5/1979 | Doelz | 364/200 |
| 4,412,285 | 10/1983 | Neches et al. | 364/200 |
| 4,435,762 | 3/1984 | Milligan et al. | 364/200 |
| 4,445,176 | 4/1984 | Burk et al. | 364/200 |
| 4,586,040 | 4/1986 | Akiba et al. | 340/825.15 |
| 4,586,158 | 4/1986 | Brandle | 364/900 |
| 4,630,196 | 12/1986 | Bednar, Jr. et al. | 364/200 |
| 4,783,734 | 11/1988 | May et al. | 364/200 |
| 5,060,150 | 10/1991 | Simor | 364/200 |
| 5,062,043 | 10/1991 | Asakawa et al. | 364/200 |

OTHER PUBLICATIONS

"Design of a Multi-Service Subscriber Loop System" Tsuda et al., NTG-Fachber (Germany), vol. 73, 1980.
"The UNIX Time-Sharing System", Dennis M. Ritchie and Ken Thompson, Communications of the ACM, vol. 17, No. 7, Jul., 1974, pp. 365-375.
"A Stream Input-Output System", D. M. Ritchie, AT&T Bell Laboratories Technical Journal, vol. 63, No. 8, Oct., 1984, pp. 1897-1910.
"The Distributed Software Concept of Remoted Processes, Their Application and Implementation", Wu--Hon Francis Leung, AT&T Technical Journal, vol. 65, May/Jun., 1986, Issue 3, pp. 2-11.

Primary Examiner—Thomas C. Lee
Assistant Examiner—Mehmet Geckil
Attorney, Agent, or Firm—Kenneth H. Samples; Ross T. Watland; Charles L. Warren

[57] ABSTRACT

Control of communication by a plurality of devices, such as computer programs and terminals, via a computer is controlled by an arrangement referred to as a connector. The connector receives a request for communication defining the devices to the communication and, in response to the request, establishes a mapping table defining the source devices and destination devices to the connection. A source device stores data in connector memory and the connector reads the mapping table to determine the destination devices for the stored data. The connector then creates a linked list coupling structure between the stored data and the determined destination devices. The destination devices issue read commands to which the connector responds by reading the stored data in accordance with the coupling structure and providing that data to the requesting device.

12 Claims, 3 Drawing Sheets

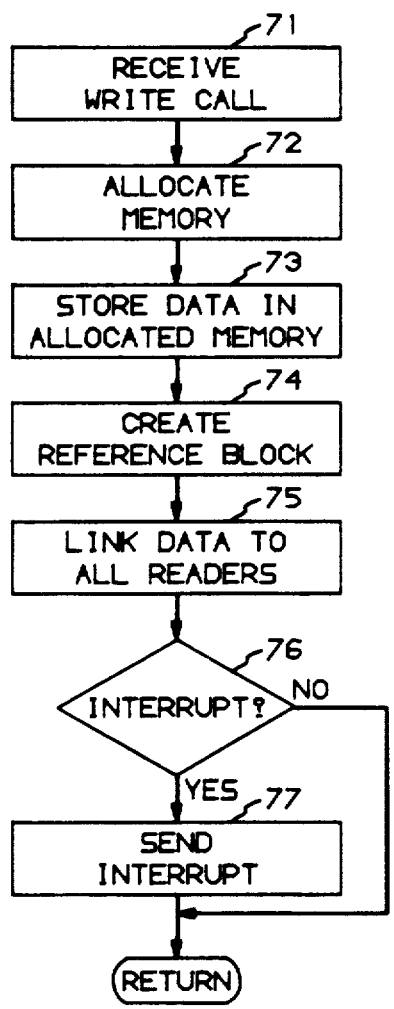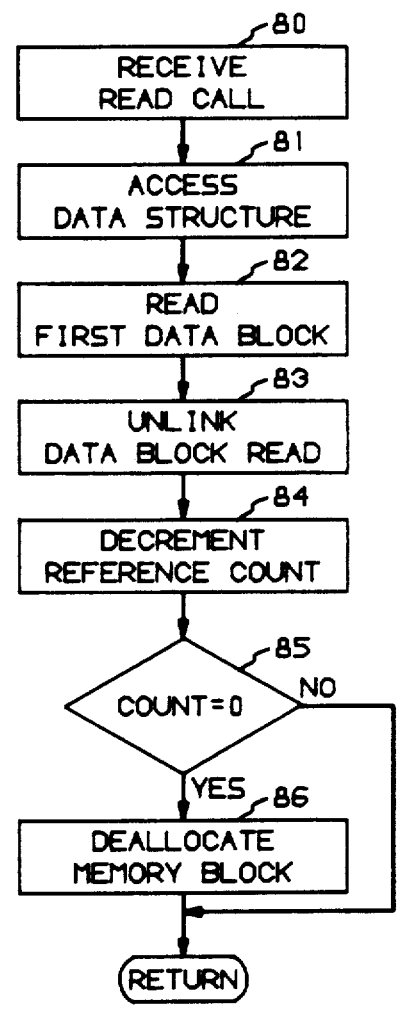
FIG. 7
MAPPING TABLE
| SOURCE | DESTINATION |
|---|---|
| TERMINAL 12 | TERMINAL 13 PROGRAM 15 |
| TERMINAL 13 | TERMINAL 12 PROGRAM 15 |
| PROGRAM 15 | TERMINAL 12 TERMINAL 13 |

# METHOD FOR DISTRIBUTING MESSAGES THROUGH A MAPPING TABLE WHICH INCLUDES FOR EACH ORIGINATING DEVICE A SEQUENTIAL LIST OF CORRESPONDING DESTINATION DEVICES

This application is a continuation of application Ser. No. 224,832, filed on Jul. 27, 1988 now abandoned.

TECHNICAL FIELD

This invention relates to communication between digital data sources and destinations through a computing arrangement.

BACKGROUND OF THE INVENTION

Computers have proven to be almost indispensable for the performance of complex mathematical functions as well as for data storage and retrieval. Computers, however, lack generalized mechanisms for providing ready intercommunication via those computers by multiple user devices. Even when multiple time sharing users are connected to a single computer, that computer is primarily a single source to a single destination communication system. One user provides data to a program which manipulates the data and stores the result in an identifiable storage area. The original user or others who know the identity of the storage area can then individually have access to the stored result.

A primary mechanism for communicating between computer terminals is called electronic mail. Electronic mail communication is, as the name implies, a post office type system. A message is formulated by a sender, addressed to one or more destinations, and stored by the electronic mail system in association with the destinations. A destination user is notified of the waiting message when logging onto the system and the message can be read. A message in response to the original is sent and received in the same manner. Electronic mail requires that the sender provide an appropriate destination for each message and the resulting communication lacks real time flow.

The UNIX ® operating system includes a feature called a "Pipe" which begins to generalize communication among computer programs. A Pipe allows the output of one program to be sent as input to another program. A Pipe consists primarily of a storage buffer, the location of which is known to the source and destination programs and of a synchronization arrangement to schedule buffer reading and writing. The source stores data into the buffer at the known location and the destination reads the stored information from the known location. With a Pipe both the source and destination must know the location of the intermediate buffer and implement the movement of data into and out of it. Another UNIX operating system feature, called a "Tee", permits intermediate results of a piped operation to be sent to one or more named files. The Tee may permit multiple destinations for information, but the destinations are only named files which must be read later by directly accessing them.

With existing computer communication arrangements the data sources and/or destinations must provide addressing information for all communication and are in primary control of a connection. Maintaining such a connection requires significant resources on the part of the sources and destinations and their human operators. The problems created by such an end point controlled arrangement are apparent from the lack of flexibility of these systems. For example, none provides a bidirectional connection nor allows the change of sources and destinations during a connection. What is needed in the art is a method of communication in a computer environment which removes the primary connection responsibilities from the sources and destinations and provides a flexible method of communication by centralizing control.

SUMMARY OF THE INVENTION

The foregoing problems are solved in an illustrative embodiment of the invention which is a generalized computer communication arrangement for providing intercommunication among a plurality of communication devices. The term devices or communication devices is not limited to hardware units such as terminals, printers, and disk drives but includes software entities such as processes, programs, and routines. Intercommunication is provided by a computer which includes a storage area, a call control program for establishing a connection, a write control program for writing data in the storage area and a read control program for reading data from the storage area.

A connection begins in response to a connection request identifying the source and destination devices to the communication. Illustratively, such a request is generated by one of the devices which will take part in the communication. The call control program responds to the request by establishing a mapping table defining the interconnection of source and destination communication devices and destinations.

A communication device which has data for communication generates a write request. The write request is received by the write control program which stores the data in the storage area. The write control program reads the mapping table to identify destination communication devices for the stored data and creates a coupling structure between the stored data and each identified destination. The coupling structure comprises a pointer for each destination communication device, which pointer identifies a linked list of stored data entries. Newly stored data is linked to the end of the linked list most remote from the pointer and remains on the linked list until it is read by a destination device.

A communication device issues a read request when it desires to receive data. The read control program responds to the read request by reading the pointer of the communication device issuing the read request to locate the linked list. The first data on the linked list is then read and transmitted to the requesting communication device.

Certain communication devices function more efficiently when they issue read requests only when data has been stored for them. The illustrative embodiment sends interrupt signals to selected devices when data for those devices has been stored. Read requests are then issued by the selected communication devices in response to the interrupts. To implement the transmission of interrupts, the mapping table of the embodiment includes an interrupt status variable for each communication device. The interrupt status variable defines whether interrupts are to be sent or not. When data is stored in the storage area the write control program checks the interrupt status variable of the destination communication devices and sends an interrupt to each destination device having an interrupt status variable defining that interrupts are to be sent.

The use of a mapping table and coupling structure also facilitates adding and deleting devices to a connection. A destination device can be added by inserting its identity into the mapping table data structures of devices from which it is to receive data. A device can be deleted by removing its identity from all data structures. Since the data structures are read to form coupling structures for each write, the change of data structures will add or remove devices starting with the first data write after the change.

The illustrative embodiment of the present invention avoids the limitations of the end point controlled arrangements of prior systems. For example, devices engage in bidirectional communication through the connector, information form one source device is sent to multiple destination devices and information is sent by multiple source devices to one destination device.

BRIEF DESCRIPTION OF THE DRAWING

FIG. 5 is a flow diagram representing a write routine used in the embodiment of FIG. 1;

FIG. 6 is a flow diagram representing a read routine used in the embodiment of FIG. 1; and FIG. 7 is a representation of a mapping table used in the embodiment.

DETAILED DESCRIPTION

Figure 1:
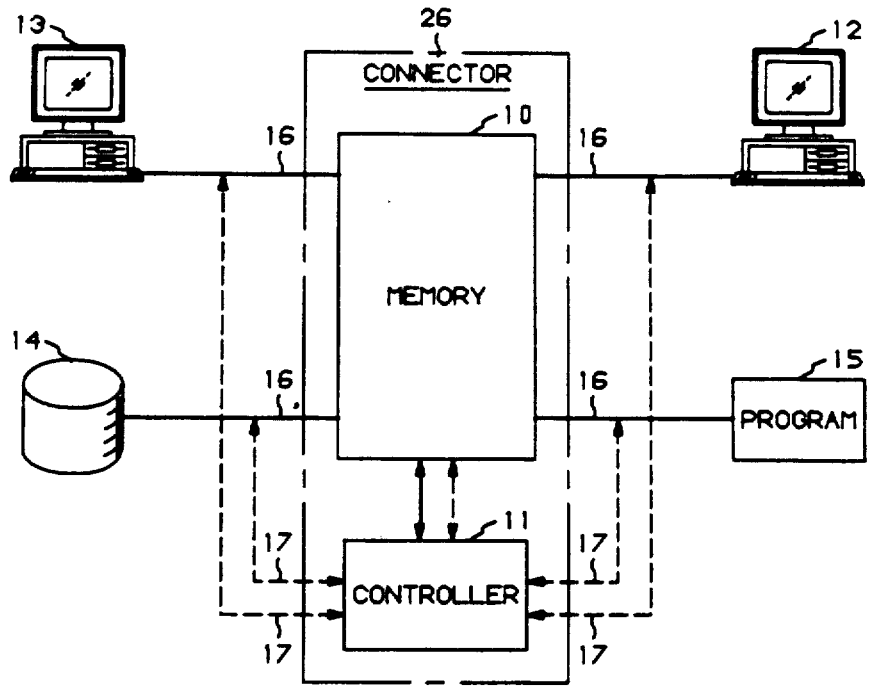
FIG. 1 is a block diagram of an embodiment of the invention.

FIG. 1 is an illustrative representation of a system embodying the present invention. FIG. 1 shows a connector 26 which comprises a memory 10 and a controller 11. A plurality of devices 12 through 15 are connected to the memory 10 via data lines e.g., 16, and to the controller 11 via control lines e.g., 17.

Communication among devices 12 through 15 flows through connector 26. Controller 11 controls the communication configuration. Initially, controller 11 receives a request over a control path 17 from one of the devices e.g., 12, defining a communication among specified devices. For example, a user at terminal device 12 requests a call among terminal devices 12 and 13 and program 15. The request also specifies that all of the devices 12, 13 and 15 can both receive data from all other devices and transmit data to all other devices.

Controller 11 responds to the request by creating a mapping table of the requested communication (FIG. 7) to connect each of the requested devices 12, 13 and 15 to the connector. The mapping table defines the sources and destinations for data flowing through the connector and is used by the connector to implement the connection of the devices 12, 13 and 15 so the devices can use the connection with little or no detailed knowledge of the actual connection configuration.

When a device e.g., 13, wants to transmit data it issues a write call to controller 11 on path 17 and provides the data to be written. Controller 11 stores the data in memory 10 and uses the mapping table to create a structure coupling the stored data to each device 12 and 15 which is to receive the data. The mapping table determines the entitlement of destinations (readers) to the data stored. Devices 12 and 15 read the stored data by issuing a read call. Controller 11 responds to a read call from a device by using the coupling structures to locate and send the stored data to the requesting device. The overhead for storing data and conveying it to entitled readers is performed by the connector.

Devices are added or removed from a connection by cooperation between the connector and the devices. For example, when a user at terminal 13 wants to store all data from terminal 13 on disk 14 that user transmits a request to controller 11 defining that all data from terminal 13 is to be sent to disk 14. Controller 11 then changes the mapping table to indicate that disk 14 is an additional destination for all data stored in the connector by terminal 13. All data written by terminal 13 to the connector after the change of the mapping table is coupled to disk device 14 for reading.

Figure 2:
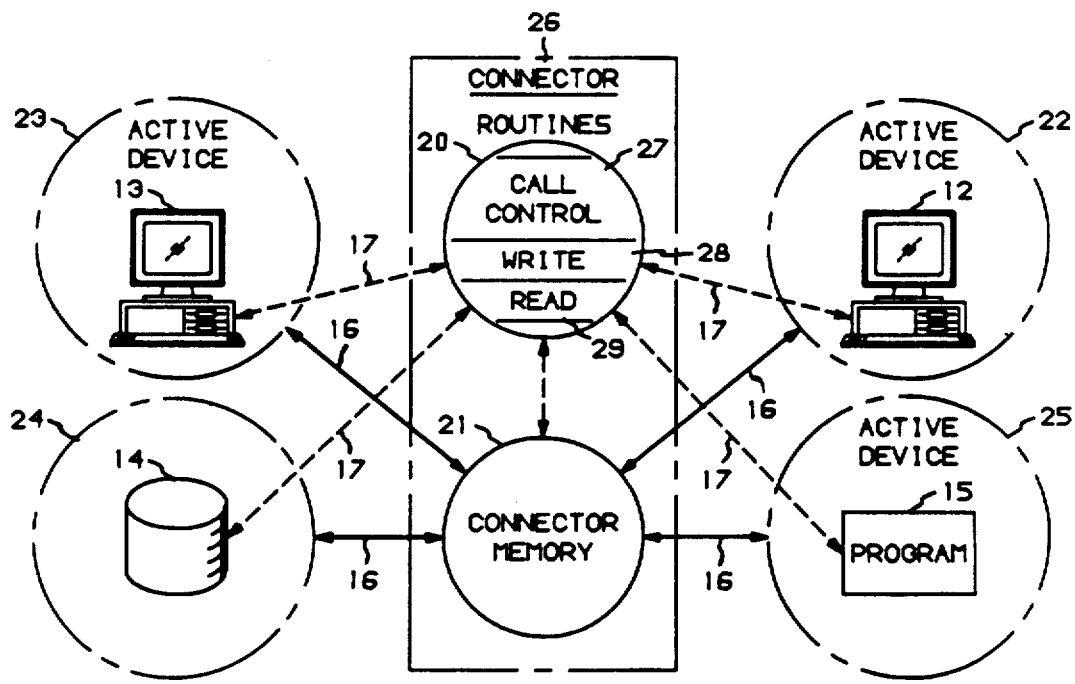
FIG. 2 is a representation of the software components of the embodiment.
Figure 3:
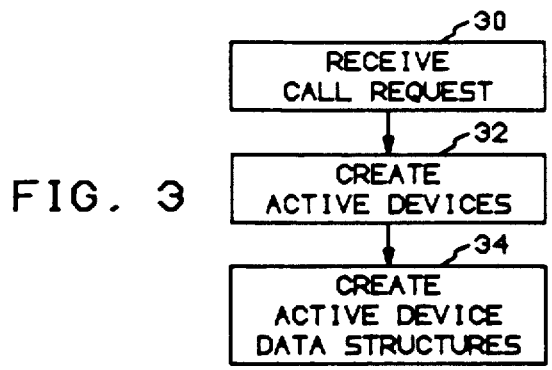
FIG. 3 is a flow diagram representing the establishment of a call.

FIG. 2, when viewed in conjunction with the flowchart of FIG. 3, shows the various software components of the present invention and how they cooperate to establish a connection. In FIG. 2 a set of routines 20 represents the connector function of controller 11 and connector memory 21 represents a portion of memory 10 which is allocated to the connector. Illustratively, a connection is initiated when call control routine 27 receives a request from a communicating device (block 30, FIG. 3) such as terminal 12. The connection request specifies that terminal 12, terminal 13 and program 15 are to take part in the call and the read/write capability of communication by these devices. In the present example, all the devices can both receive and transmit data. Call control routine 27 responds to the request by creating an active device (block 32, FIG. 3) for each device specified in the connection request. An active device conforms to a uniform interface provided by the connector 26 and is capable of issuing write calls when data is to be conveyed from the device to the connector and of issuing read calls when data is to be conveyed from the connector to the device. To create an active device the call control routine 27 dedicates a process to reading and writing the device and transferring data to and/or from the connector 26. The active device process will have been prepared beforehand for the particular type of device to which it is dedicated. In FIG. 2 the active devices for devices 12, 13, 14, and 15 are represented by circles numbered 22, 23, 24, and 25 respectively. After the active devices are created, they provide connection to the connector 26. Also in response to the connection request, the call control routine creates (block 34, FIG. 3) a data structure of the type shown in FIG. 4 for each active device. The active device data structures collectively constitute the mapping table of the connection.

Figure 4:
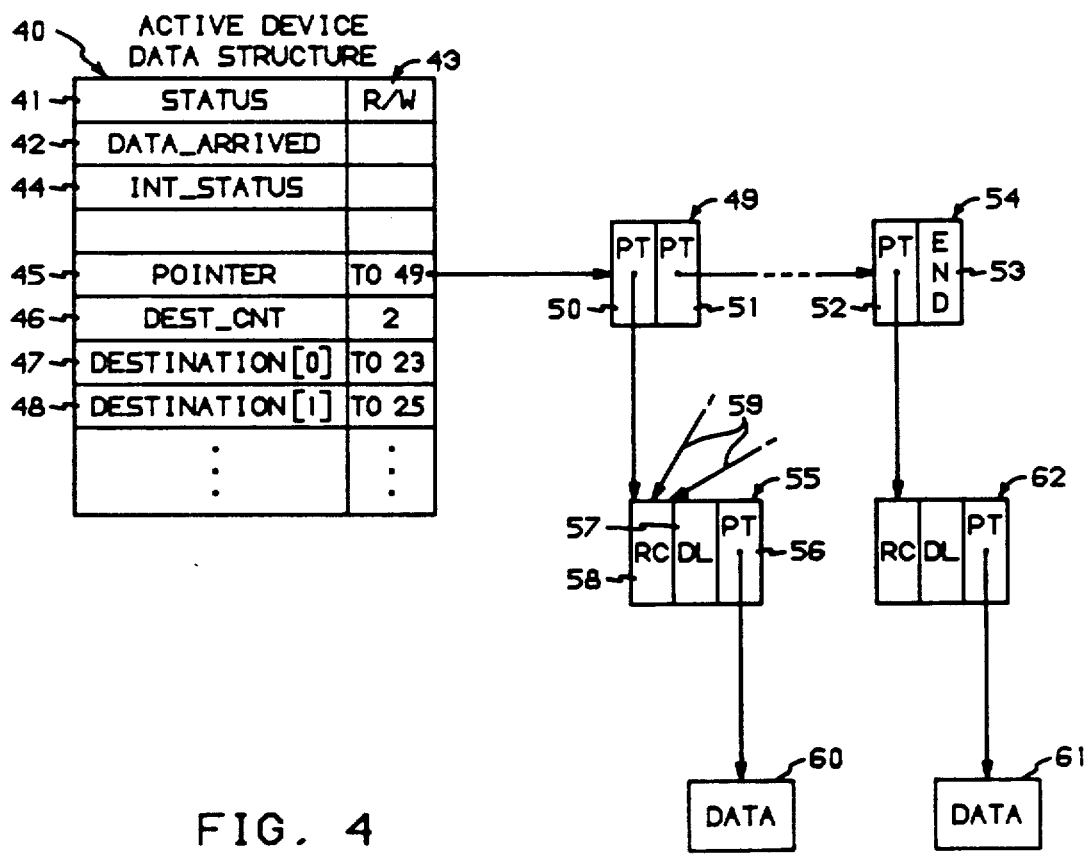
FIG. 4 represents certain stored information for defining connections.

FIG. 4 represents an active device data structure 40 and certain coupling structures used in the present embodiment. A status entry 41 in data structure 40 defines the read and/or write capability of the associated active device. A destination count (DEST_CNT) entry 46 indicates the number of devices which are to read data written to the connector by the associated active device. The next entries e.g., 47 and 48, define the destination devices which read data written to the connector by the associated active device. Two destination entries are shown in FIG. 4 for conformity with the present example. The total number of destination entries can be as large as the number of active devices connected to the connector. Column 43 of data structure 40 indicates the data structure values for active device 22 of the present example. The status entry 41 indicates both read and write (R/W). The destination count 46 indicates 2 destinations and the destination entries 47 and 48 identify the data structures associated with active devices 23 and 25. Each data structure 40 also contains a pointer entry 45 which is used as discussed below to locate data to be read by the associated active device.

The information stored in the data structures 40 collectively constitutes the mapping table for a connection and defines the characteristics of communication among the devices of the connection. The connector routines 20 consult the mapping table (data structures) to control the communication through the connector and thereby relieve the active devices of such tasks. Further, modifications can be made to the mapping table to easily implement changes in the nature of a connection. Data is stored in the connector by write routine 28, the flow diagram for which is shown in FIG. 5. When data is to be written to the connector by an active device e.g., 22, the data is first stored in a buffer which is a part of the active device process and a write call is issued by the active device. The write call identifies the active device 22 issuing the command and the buffer location. Write routine 28 receives write calls (block 71, FIG. 5) and responds to them by allocating space in connector memory 21 (block 72). The write routine then moves the buffered data from the active device to the allocated memory (block 73). Write routine 28 also creates a reference block 55 (FIG. 4) for each block of data stored in the connector (block 74, FIG. 5). A reference block 55 is comprised of a data pointer 56, a data length (DL) value 57 and a reference count (RC) 58. The data pointer 56 points to the newly written data 60 and the data length value 57 defines the amount of stored data. The reference count 58 indicates the number of entitled destinations and is described later herein. The write routine 28 next creates a coupling structure by linking (block 75, FIG. 5) the data 60 and reference block 55 to all destination active devices which are to receive the data block. The coupling to multiple destination devices is represented by arrows 59 and the pointer 50.

The coupling structure between blocks of data e.g., 60, and data structure is shown in FIG. 4 in which all pointers are labeled PT. The pointer 45 of data structure 40 points to a pointer block 49 which includes pointer 50 to the reference block 55 associated with data 60. Pointer block 49 is also coupled to a subsequent pointer block 54 by a pointer 51. Pointer block 54 is associated with the last (most recently written) data block 61 so it includes a pointer value 53 denoting the END of the pointer linkage.

The write routine 28 couples each destination to stored data by:
  identifying each destination from the destination values e.g., 47 and 48 in the data structure 40 for the writing device,
  accessing the pointer 45 of each destination data structure and following the read linkage to the END,
  creating for the new data block a new pointer block linked to the prior END, and
  linking the new pointer block to the reference block of the newly written data.

This action connects each block of newly written data to the end of a data link list of reach device which is to be a destination for the data. A given reference block e.g., 55, and its associated data block 60 are linked to multiple data structures when data from a source device goes to multiple destinations. The number of destinations for a given data block e.g., 60, is stored in the reference count entry 58 of the reference block 55 pointing to the data block.

An active device generates a read call when it wishes to receive data from the connector. The read call identifies the reading device and specifies the location of an active device buffer in which to store the data. The flow diagram of FIG. 6 shows the actions undertaken by the read routine 29 in response to read calls. The connector read routine 29 responds (block 80, FIG. 6) to the read call by accessing (block 81, FIG. 6) the data structure of the active device which issued the read call. Pointer 45 of this data structure is used to identify the data block e.g., 60 which is most directly coupled to the data structure 40. The linkages established by the connector when data is written assure that this will be the "oldest" data block.

When an entire block e.g., 60, has been read (block 82, FIG. 6) by an active device, as determined by the data length 57, the read routine 29 unlinks that data block (block 83, FIG. 6) and changes the pointer 45 to pint to the next pointer block e.g., 54. The read routine 29 also decrements the reference count (block 84, FIG. 6) stored in entry 58 of reference block 55. The reference count 58 is then checked (block 85) to see if it has been reduced to zero. When the reference count becomes zero all entitled destinations have read the associated data block and the read routine 29 deallocates (block 86) the data block and reference block memory for further use.

The pointer blocks e.g., 49 and 54 form a linked list and define, on a per destination device basis, the order of reading for an active device. The data blocks 60 and 61 and their connected reference blocks 55 and 62 are stored once for each block of data stored in the connector. Multiple destination active device data structures may point to a single data block e.g., 60 through the reference block e.g., 55 connected to that data block. The linked list formed by pointer blocks 49 and 54 may point to data from multiple data sources. For example, when data from device 13 is stored in data block 60 and later arriving data from device 15 is stored in data block 61 the coupling structure as shown in FIG. 4 represents the coupling structure for device 12. After the establishment of the FIG. 4 coupling structure successive read calls from device 12 result in data from device 13 in data block 60 being transferred, followed by data from device 15 in data block 61.

The present embodiment includes simple mechanisms for adding and deleting devices to a connection. A device is added to a call in response to a request from one of the existing active devices to the call control routine 27 (FIG. 2). Call control routine 27 activates the requested device and creates a data structure as above described. The new data structure includes as destinations any specified ones of the other active devices connected to the connector. The new active device is also added as a destination to those existing data structures which are to be sources of data for the new active device. Any data written to the connector after the creation of the new active device data structure will be coupled for reading by the new active device, just as in the preceding description. Active devices can be deleted by removing them from the mapping structure. Such removal involves deleting the data structure of the active device to be removed and deleting each reference to the active device to be removed from the data structures of the other devices to the connector.

In the preceding description all active device receivers generated read calls whenever these devices desired to read information. This possibly results in wasted processor time by attempting to read the connector when no data is actually available for the destination active device to read. The write routine 28 of the present embodiment includes the ability to send interrupts to destination active devices when data has arrived for that active device. First, the data structure 40 (FIG. 4) of each active device includes an interrupt status variable 44 (INT_STATUS) which may be set to indicate that interrupts are to be sent or not sent. Also, a data arrived entry 42 is stored in the data structure defining the type of interrupt message which is to be sent. The write routine 28 checks (block 76, FIG. 5) the interrupt status variable 44 of each destination device to which it links a written data block. When the interrupt status variable indicates that an interrupt is to be sent, the write routine 28 sends an interrupt (block 77, FIG. 5) in the format defined by the data arrived entry 42. The destination active device then reads information in response to the interrupt.

The preceding description refers to the exchange of data between and among devices. Data as used herein includes information generated by electronic blackboards, graphics terminals and speech digitizing equipment as well as the more traditional devices such as computer terminals and disk storage arrangements.

In the preceding embodiment, the connector is a collection of data structures and routines which can be called by the active devices. The connector can, however, be implemented using other types of software entities such as processes. Also, in the present embodiment all devices connected to the connector take part in a single communication. It should be noted that the connector can be used for multiple independent communications. For example, a first pair of terminals can communicate through a connector while a second pair of terminals can simultaneously communicate through the connector without exchanging data with the first pair of terminals.

We claim:

1. A method for utilizing a communication connector to control the distribution of messages received from originating devices and destined for receiving devices including first and second receiving devices, the method comprising the steps of:
   storing in a memory in said communication connector a mapping table having, for each originating device, a sequential list of corresponding receiving devices;
   storing in said memory each message received from an originating device after said mapping table storing step;
   creating, for each stored message based on said mapping table, a coupling structure including pointers associated with each stored message, each pointer corresponding to a receiving device and being assigned sequentially according to said sequential list, the creation of a coupling structure for a stored message being completed before the creation of a coupling structure for another message is initiated;
   responsive to said communication connector receiving a request from said first and second devices, conveying each stored message having a pointer associated with the first and second devices to said first and second devices, respectively, in a sequential order as determined by said sequential assignment of pointers associated with first and second devices, whereby a series of messages each sent to said first and second devices via said communication connector will be received by said second device in the same sequence as received by said first device.

2. The method of claim 1 wherein said message storing step stores each message in only one location in said memory and said conveying step transmits each message to the corresponding receiving devices without duplicating said message in other locations in said memory.

3. The method of claim 1 wherein the sequence of messages received by said first and second devices via said communication connector depends only on the mapping table sequence of receiving devices and the order in which said coupling structures are created.

4. The method of claim 1 further comprising the steps of said communication connector receiving, after said mapping table storing step, a request from an originating device specifying an additional receiving device, and adding said additional receiving device to said mapping table in response to said request.

5. The method of claim 1 further comprising the steps of said communication connector receiving, after said mapping table storing step, a request specifying a receiving device for removal from said mapping table and removing the specified receiving device from said mapping table in response to said request.

6. The method of claim 1 further comprising the step of said connector transmitting an interrupt signal to said first device in response to the creating step creating a coupling structure with a pointer associated with said first device, said interrupt signal notifying said first device that a message for it is stored in said connector.

7. A method for utilizing a communication connector to control the distribution of messages received from first and second originating devices and destined for at least third and fourth receiving devices, the method comprising the steps of:
   storing in a memory said communication connector a first and second mapping table for said first and second originating devices, respectively, said first and second tables each having a sequential list of corresponding receiving devices including said third and fourth receiving devices;
   storing in said memory each message received from said first and second originating devices after said mapping table storing step;
   creating, for each stored message based on said mapping tables, a coupling structure including pointers associated with each stored message, each pointer corresponding to a receiving device and being assigned sequentially according to said sequential list, the creation of a coupling structure for a stored message being completed before the creation of a coupling structure for another message is initiated;
   responsive to said communication connector receiving a request from said third receiving device, conveying each stored message having a pointer associated with the third device to said third device in a sequential order as determined by said sequential assignment of pointers associated with the third device;
   responsive to said communication connector receiving a request from said fourth receiving device, conveying each stored message having a pointer associated with the fourth device to said fourth device in a sequential order as determined by said sequential assignment of pointers associated with the fourth device, whereby a series of messages sent from said first and second originating devices to said third and fourth devices via said communication connector will be received by the fourth device in the same sequence as received by the third device.

8. The method of claim 7 further comprising the steps of said communication connector receiving, after said mapping table storing step, a request from the first originating device specifying an additional receiving device, and adding said additional receiving device to said first mapping table in response to said request.

9. The method of claim 7 further comprising the steps of said communication connector receiving, after said mapping table storing step, a request specifying the fourth receiving device for removal from said first mapping table and removing the specified receiving device from said first mapping table in response to said request.

10. The method of claim 1 further comprising the step of said connector transmitting an interrupt signal to said third receiving device in response to the creating step creating a coupling structure with a pointer associated with said third receiving device, said interrupt signal notifying said third receiving device that a message for it is stored in said connector.

11. The method of claim 1 wherein said message storing step stores each message in only one location in said memory and said conveying step transmits each message to the corresponding receiving devices without duplicating said message in other locations in said memory.

12. The method of claim 1 wherein the sequence of messages received by said third and fourth receiving devices via said communication connector depends only on the sequence of receiving devices in the mapping tables and the order in which corresponding coupling structures are created.

* * * * *